United States Patent [19]
Bibbee

[11] Patent Number: 5,611,118
[45] Date of Patent: Mar. 18, 1997

[54] VISORED HEADWEAR RETAINING DEVICE

[76] Inventor: E. Bruce Bibbee, 2281 Baird Rd., Fostoria, Ohio 44830

[21] Appl. No.: 570,005

[22] Filed: Dec. 8, 1995

[51] Int. Cl.$^6$ .................................... A41F 1/00; F16G 11/00
[52] U.S. Cl. ........................... 24/298; 24/115 G; 24/300; 24/712; 2/195.1
[58] Field of Search ........................... 24/298, 300, 302, 24/304, 115 G, 115 H, 115 K, 712; 2/195.1, 195.2, 195.3

[56] References Cited

U.S. PATENT DOCUMENTS

| Re. 27,986 | 4/1974 | Jensen | 24/115 G |
|---|---|---|---|
| 867,814 | 10/1907 | Fornander | 24/298 |
| 2,112,625 | 3/1938 | Jackson | 24/115 G |
| 2,820,269 | 1/1958 | Wolff | 24/300 |
| 3,696,474 | 10/1972 | Slauta | 24/712 |
| 4,406,040 | 9/1983 | Cannone | 2/195.1 |
| 4,453,292 | 6/1984 | Bakker | 24/115 G |
| 5,144,695 | 9/1992 | Schweiber | 2/195.1 |
| 5,323,514 | 6/1994 | Masuda et al. | 24/115 G |

FOREIGN PATENT DOCUMENTS 1276059   10/1961   France ........................... 24/115 G

*Primary Examiner*—Victor N. Sakran
*Attorney, Agent, or Firm*—Howard & Howard Atty

[57] ABSTRACT

A device for retaining a visored cap upon a wearer's head under high wind conditions includes a strap member and a pair of clamp members that directly engage the strap member and a portion of a visor on a cap. The direct coupling between the strap member and the visor on the cap, which is maintained by the clamp members, is particularly advantageous for maintaining a cap in a desired position on a wearer's head under high wind conditions. The retaining device of this invention also includes an adjustment member that allows a wearer to vary the effective length of the strap member to ensure a snug fit. Each of the clamp members and the adjustment member include a housing having a cavity and an opening formed therein, a pin member slidable in the cavity and having an opening formed therein and a spring to bias the pin member thereby clamping the strap member in the openings.

18 Claims, 1 Drawing Sheet

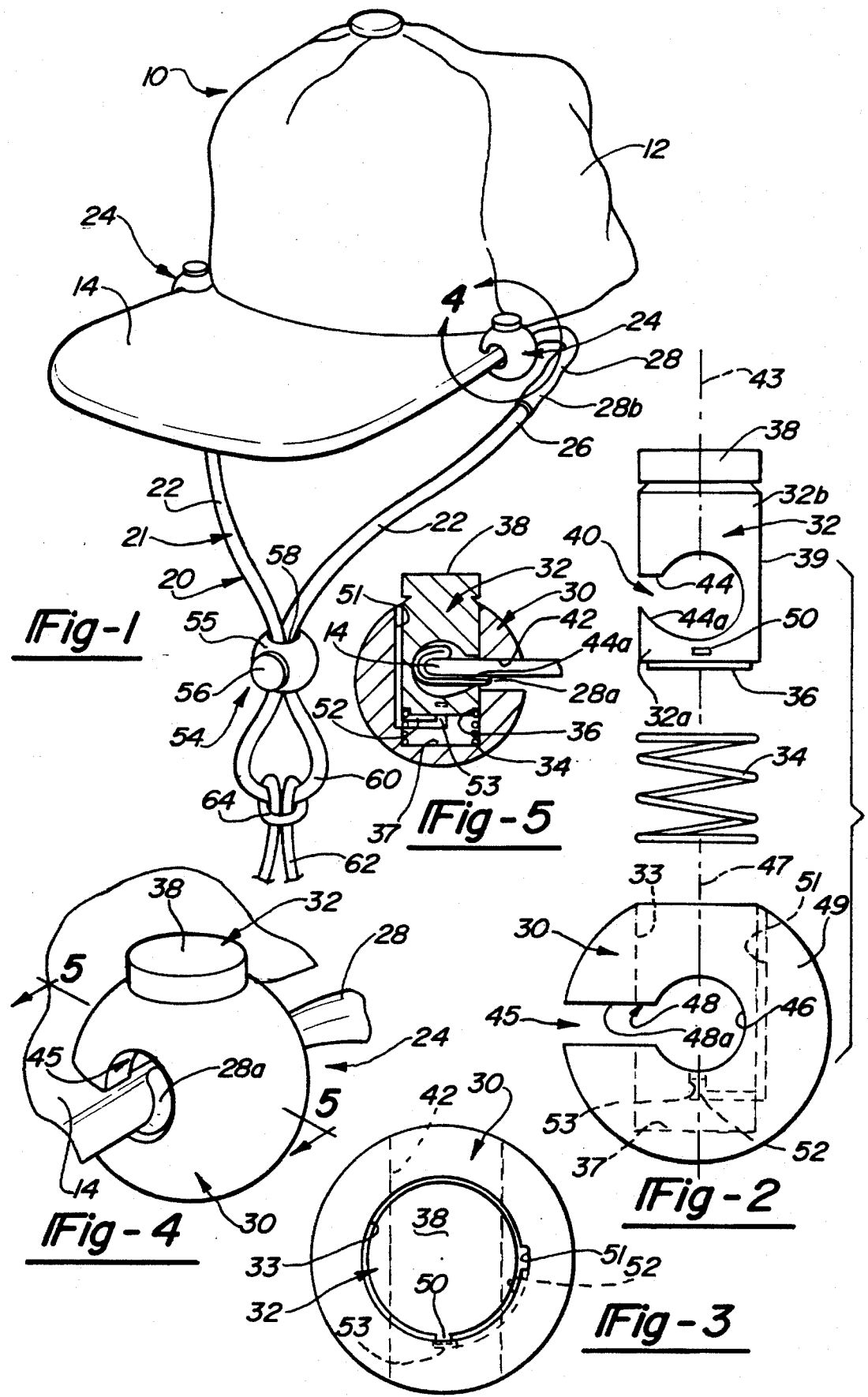

5,611,118

VISORED HEADWEAR RETAINING DEVICE

BACKGROUND OF THE INVENTION

This invention relates generally to a device for keeping a hat on a wearer's head and, in particular, to a device for retaining a visored cap upon a wearer's head.

Visored caps, especially baseball hats, are currently very popular. One difficulty experienced by people wearing visored caps is that the cap can be unexpectedly lifted from a person's head under windy conditions. This problem is particularly bothersome when traveling in an open air vehicle, such as a convertible automobile, motorcycle, jet ski, speed boat, or amusement park ride, at relatively high speeds.

Although others have attempted to solve this problem, prior devices for retaining a cap are not effective under the high wind conditions just mentioned. For example, the U.S. Pat. No. 5,144,695, issued to Schweizer, shows a hat retention device that is useful in preventing a child from losing a hat. That device is ineffective at maintaining a hat in place on a wearer's head, however, under high wind conditions. It is possible for a hat that is used in connection with the Schweizer device to be displaced from the wearer's head because of the manner of connection between the retaining device and the hat. Further, the Schweizer device may not be durable under high wind conditions.

Therefore, it is desirable to provide a visored cap retaining device that is effective for maintaining a cap in place on a wearer's head, even under high wind conditions. For example, when driving a motorcycle, it is important to maintain the visor of a cap in place to shield the driver's eyes from the sun. It is important, therefore, to maintain the visor in a desired position on the driver's head. This invention provides a device that is effective for maintaining a visored cap in place on a wearer's head, even under high wind conditions.

SUMMARY OF THE INVENTION

In general terms, this invention is a device for retaining a visored cap upon a wearer's head including a strap member, which has two free ends. The strap member can include a pair of strap sections each having a first end as one of the free ends and a second end. A pair of clamp members each have a housing with a cavity and a generally C-shaped opening formed therein, a pin member slidable in the cavity and having a generally C-shaped opening formed therein and a biasing means, such as a spring, in the cavity for biasing the pin member. The pin member opening has a first engagement surface and the housing opening has a second engagement surface such that the biasing means biases the first engagement surface toward the second engagement surface. When pressure is applied to the pin members against the biasing means to move the first and second engagement surfaces of each clamp member away from one another and align the pin member opening with the housing opening in each clamp member, one of the first ends of the strap sections and a portion of a visor of a cap can be inserted into the housing opening and the pin member opening of an associated one of said clamp members. When the pressure is removed from the pin members, the first ends of the strap sections and the portions of the visor are releasably attached together. The device according to the present invention also includes an adjustment member for selectively and adjustably engaging a portion of the strap sections including a housing with a cavity and a central aperture formed therein, a pin member slidable in the adjustment member housing cavity and having a central aperture formed therein, a portion of each of the strap sections extending through the central apertures, and a biasing means in the adjustment means housing cavity for biasing the adjustment means pin member. When pressure is applied to the adjustment member pin member against the adjustment member biasing means to align the central apertures, the adjustment member can be moved along the strap sections to selectively vary a distance between the adjustment member and the first ends of the strap sections to accommodate a head of a wearer of the cap. When the pressure is removed from the adjustment member pin member, walls of the central apertures engage the strap sections to prevent movement of the adjustment member along the strap sections.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of a visored cap and a retaining device in accordance with this invention;

FIG. 2 is an exploded view of a clamp member included in the retaining device shown in the FIG. 1;

FIG. 3 is a top plan view of the clamp member shown in the FIG. 2;

FIG. 4 is an enlarged view of the circled portion 4 of the FIG. 1 showing the clamp member; and FIG. 5 is a cross-sectional view taken along the line 5—5 in the FIG. 4.

DESCRIPTION OF THE PREFERRED EMBODIMENT

There is shown in the FIG. 1 a cap 10 having an inverted cup-shaped head portion 12 and a visor 14 attached to and extending from an edge of the head portion. A retaining device 20 includes a strap member 21, formed as a pair of strap sections 22, and a pair of clamp members 24 for engaging opposite free ends of the strap member and portions of an edge of the visor 14. Each of the strap sections 22 has a first end 26 which is inserted into and attached to an end of an associated sleeve 28. The sleeves 28 are tubular and are formed of a latex or similar material to facilitate a more secure engagement between the visor 14 and the strap sections 22 by the clamp members 24.

It is important to a device designed in accordance with this invention that the clamp members 24 be secured directly to the visor 14 of the cap 10. A direct engagement to the visor 14 provides for stable maintenance of the cap 10 upon a wearer's head, even under high wind conditions. The coupling of the first ends 26 of the strap sections 22 directly to the visor 14 by the clamp members 24 and the sleeves 28 also provides the advantage of making the retaining device 20 more stable and dependable than prior devices.

There is shown in the FIG. 2 an exploded view of a preferred embodiment of the clamp members 24. Each of the clamp members 24 includes a generally spherical housing 30 and a generally cylindrical pin member 32 that is received in and is slidably movable within a generally cylindrical pin cavity 33 formed in the housing. A biasing means such as a spring 34 is compressed between a lower end 32a of the pin member 32 and a facing bottom surface 37 of the cavity 33.

A spring retainer 36 has a diameter approximately equal to an interior diameter of the spring 34 and extends from the lower end 32a of the pin member 32 for receiving an upper end of the spring. The spring 34 serves to bias the pin member 32 in a direction away from the bottom surface 37 of the pin cavity 33. The pin member 32 has a button portion 38 formed at an upper end 32b thereof and a side surface 39 extending between the upper and lower ends of the pin member.

The movable pin member 32 includes a generally C-shaped opening 40 formed therethrough that is defined by a generally cylindrical aperture portion 42 extending generally perpendicular to and through a longitudinal axis 43 of the pin member and a slotted portion 44 extending radially outwardly from the aperture portion. A longitudinal axis of the cavity 33 is co-extensive with the longitudinal axis 43 such that the aperture portion 42 extends through the cavity. The aperture portion 42 and the slotted portion 44 are both open to the side surface 39 of the pin member 32. A C-shaped opening 45, configured similarly to the C-shaped opening 40, is provided in the housing 30. The C-shaped opening 45 is defined by a generally cylindrical aperture portion 46 extending generally perpendicular to and through a longitudinal axis 47 of the housing 30 and a slotted portion 48 extending radially outwardly from the aperture portion. The housing 30 has an outer surface 49 and the aperture portion 46 and the slotted portion 48 are both open to the outer surface of the housing. As explained below, a lower wall of the slotted portion 44 and an upper wall of the slotted portion 48 serve as first and second engagement surfaces respectively. The spring 34 biases the first engagement surface toward the second engagement surface for releasably retaining the first ends 26 of the strap sections 22.

As best seen in the FIG. 1, the FIG. 4 and the FIG. 5, the sleeve 28 has a free end 28a for engagement with the clamp member 24 and an opposite end 28b into which the first end 26 of an associated strap section 22 is inserted and retained. Typically, the first end 26 is retained in the end 28b by shrink fitting or frictional engagement. The free end 28a of the latex sleeve 28 and an edge portion of the visor 14 are received in the generally C-shaped openings 40 and 45 when the spring 34 and the pin member 32 are inserted into the pin cavity 33. A lower wall 44a of the slotted portion 44 is the first engagement surface and an upper wall 48a of the slotted portion 48 is the second engagement surface as discussed above. A finger (not shown) of a hand can be pressed down on the button portion 38 on the pin member 32 to move the pin member within the housing 30 against the bias of the spring 34 in order to align the openings 40 and 45. Then the sleeve end 28b and a portion of the visor 14 can be manipulated into the generally C-shaped openings 40 and 45. When the pressure on the button portion 38 is released, the spring 34 forces the first engagement surface 44a toward the second engagement surface 48a to releasably clamp the sleeve 28 and the attached first end 26 of the strap section 22 with the visor 14.

Referring now to the FIGS. 2, 3 and 5, there is shown a radially extending tab 50 formed on the side surface 39 of the pin member 32 between the spring retainer 36 and the aperture portion 42. The tab 50 is received within a groove formed in a side wall of the cavity 33. The groove includes a first groove portion 51 extending generally parallel to the longitudinal axis 47. The first groove portion 51 extends from a first end thereof at an upper open end of the cavity 33 to a second end thereof at a point spaced above the bottom surface 37. A second groove portion 52 is formed in the side wall of the cavity 33 and extends generally horizontally from a first end thereof open to the second end of the first groove portion 51 through an arcuate path of about 90° to a second end thereof. A third groove portion 53 is formed in the side wall of the cavity 33 and extends generally vertically from a first end thereof open to the second end of the second groove portion 52 to a second end thereof open to the aperture portion 46.

In order to assemble the clamp member 24 illustrated in the FIG. 2, for example, the spring 34 is inserted into the cavity 33 followed by the pin member 32 with the tab 50 aligned with the first groove portion 51. Pressure is applied to the button portion 38 to force the pin member 32 toward the bottom surface 37 and the tab 50 downwardly to the second end of the first groove portion 51. Then the pin member 32 is rotated clockwise (as viewed in the FIG. 3) to move the tab 50 into the second groove portion 52 whereby the pin member is retained in the cavity 33 against the bias of the spring 34. When the clamp member 24 is to be attached to the visor 14 of the cap 10, the pin member 32 is rotated clockwise until the tab 48 is aligned with the third groove portion 53. Enough pressure is applied to the button portion 38 to maintain the openings 40 and 45 in alignment. A portion of the visor 14 and the free end 28a of the sleeve 28 are inserted into the openings 40 and 45 and the pressure on the button portion 38 is released to permit the spring 34 to move the pin member 32 upwardly in the cavity 33 thereby clamping the visor and the sleeve between the first engagement surface 44a and the second engagement surface 48a. A retaining device 20 designed in accordance with this invention includes the clamp members 24, which are a substantial improvement over those utilized with prior retention devices.

Referring again to the FIG. 1, the retaining device 20 includes an adjustment member 54. The adjustment member 54 has a housing 55 and a pin member 56. The adjustment member 54 is very similar in construction to the clamp members 24 with the exception that the slotted portions 44 and 48 of the openings 40 and 45 respectively have been eliminated. Rather, a central aperture 58, similar to the aperture portion 46, extends radially through the housing 55 and a corresponding aperture (not shown but similar to the aperture portion 42) is formed through the pin member 56. A portion 60 of each of the strap sections 22 adjacent a second end 62 thereof is received through the central aperture 58 and the aperture in the pin member 56 such that the adjustment member 54 is retained on the strap member 21 intermediate the ends of the strap sections. The second ends 62 then are tied together to form a stop means 64 to prevent the adjustment member 54 from sliding off the strap sections 22 at the ends 62. Of course, the strap member 21 could be a continuous strap with the second ends 62 of the strap sections 22 joined together and either looped together to form the stop means 64 or provided with a bead or a tab as a stop means. In the preferred embodiment, the strap sections 22 are formed of a Nylon material and the housings 30 and 55 and the pin members 32 and 56 are formed of a plastic material.

The adjustment member 54 can be moved along the length of the strap sections 22 by depressing a button portion on the pin member 56 (similar to the button portion 38 described above) and moving the adjustment member accordingly. When the pin member 56 is released, the bias of a spring (not shown but similar to the spring 34 previously described) causes the portions of the strap sections 22 within the central aperture 58 to be clampingly engaged between walls of the apertures formed in the housing 55 and the pin member 56. Moving the adjustment member 54 along the strap sections 22 enables a user to vary the effective size of the retaining device 20 in order to ensure a snug fit.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A device for retaining a visored cap upon a wearer's head, comprising: a strap member having opposite free ends;

a pair of clamp members each having a housing with a cavity and an opening formed therein, a pin member slidable in said cavity and having an opening formed therein and a biasing means in said cavity for biasing said pin member, said pin member opening having a first engagement surface, said housing opening having a second engagement surface and said biasing means biasing said first engagement surface toward said second engagement surface, said opening in said pin member including a central aperture portion extending generally perpendicular to a longitudinal axis of said pin member and a slotted portion extending radially from said central aperture to a side surface of said pin member, said first engagement surface being formed in said slotted portion; and an adjustment member for selectively and adjustably engaging a portion of said strap member whereby when pressure is applied to said pin members against said biasing means to move said first and second engagement surfaces of each said clamp member away from one another and align said pin member opening with said housing opening in each said clamp member, one of said free ends of said strap member and a portion of a visor of a cap can be inserted into said housing opening and said pin member opening of an associated one of said clamp members, and when said pressure is removed from said pin members, said free ends of said strap member and the portions of the visor are releasably attached together and said adjustment member can be moved along said strap member to selectively vary a distance between said adjustment member and said free ends of said strap member to accommodate a head of a wearer of the cap.

2. The device according to claim 1 including a pair of flexible sleeves each having one end attached to an associated one of said free ends of said strap member and an opposite end for engagement between said first and second engagement surfaces.

3. The device according to claim 2 wherein said flexible sleeve is formed of latex or a similar material.

4. The device according to claim 1 wherein said strap member includes a pair of strap sections each having one of said free ends and an opposite second end for engagement with said adjustment member.

5. The device according to claim 1 wherein said opening in said housing includes a central aperture portion extending generally perpendicular to a longitudinal axis of said cavity and a slotted portion extending radially from said central aperture to a side surface of said housing, said second engagement surface being formed in said slotted portion.

6. The device according to claim 1 wherein said biasing means is a spring having one end abutting a bottom surface of said cavity and another end abutting a lower end of said pin member.

7. The device according to claim 6 wherein said spring that has an end abutting a bottom surface of said cavity and an opposite end abutting a lower end of said pin member.

8. The device according to claim 1 wherein said pin member has a generally radially outwardly extending tab and said housing includes a groove formed in a side wall of said cavity for receiving said tab, said groove having a first groove portion extending generally parallel to a longitudinal axis of said cavity, an arcuate second groove portion extending in a plane generally perpendicular to said longitudinal axis and a third groove portion extending generally parallel to said longitudinal axis.

9. The device according to claim 1 including a stop on said strap member for preventing said strap member from disengaging from said adjustment member.

10. The device according to claim 9 wherein said stop member is a knot tied in said strap member.

11. The device according to claim 1 wherein said adjustment member has a housing with a cavity and a central aperture formed therein, a pin member slidable in said adjustment member housing cavity and having a central aperture formed therein, a portion of said strap member extending through said central apertures, and a biasing means in said adjustment member housing cavity for biasing said adjustment member pin member whereby when pressure is applied to said adjustment member pin member against said adjustment member biasing means to align said central apertures, said adjustment member can be selectively moved along said strap member, and when said pressure is removed from said adjustment member pin member, walls of said central apertures engage said strap member to prevent movement of said adjustment member along said strap member.

12. A device for retaining a visored cap upon a wearer's head, comprising:

a strap member having opposite free ends;

a pair of clamp members each having a housing with a cavity and an opening formed therein, a pin member slidable in said cavity and having an opening formed therein and a biasing means in said cavity for biasing said pin member, said pin member opening having a first engagement surface, said housing opening having a second engagement surface and said biasing means biasing said first engagement surface toward said second engagement surface whereby when pressure is applied to said pin members against said biasing means to move said first and second engagement surfaces of each said clamp member away from one another and align said pin member opening with said housing opening in each said clamp member, one of said free ends of said strap member and a portion of a visor of a cap can be inserted into said housing opening and said pin member opening of an associated one of said clamp members, and when said pressure is removed from said pin members, said free ends of said strap member and the portions of the visor are releasably attached together, said opening in said pin member including a central aperture portion extending generally perpendicular to a longitudinal axis of said pin member and a slotted portion extending radially from said central aperture to a side surface of said pin member, said first engagement surface being formed in said slotted portion; and an adjustment member for selectively and adjustably engaging a portion of said strap member including a housing with a cavity and a central aperture formed therein, a pin member slidable in said adjustment member housing cavity and having a central aperture formed therein, a portion of said strap member extending through said central apertures, and a biasing means in said adjustment member housing cavity for biasing said adjustment member pin member whereby when pressure is applied to said adjustment member pin member against said adjustment member biasing means to align said central apertures, said adjustment member can be moved along said strap member to selectively vary a distance between said adjustment member and said free ends of said strap member to accommodate a head of a wearer of the cap, and when said pressure is removed from said adjustment member pin member, walls of said central apertures engage said strap member to prevent movement of said adjustment member along said strap member.

13. The device according to claim 12 including a pair of flexible sleeves each having one end attached to an associated one of said free ends of said strap member and an opposite end for engagement between said first and second engagement surfaces.

14. The device according to claim 12 wherein said strap member includes a pair of strap sections each having one of said free ends and an opposite second end for engagement with said adjustment member.

15. The device according to claim 12 wherein said opening in said housing includes a central aperture portion extending generally perpendicular to a longitudinal axis of said cavity and a slotted portion extending radially from said central aperture to a side surface of said housing, said second engagement surface being formed in said slotted portion.

16. The device according to claim 12 wherein said biasing means is a spring having one end abutting a bottom surface of said cavity and another end abutting a lower end of said pin member.

17. The device according to claim 12 wherein said pin member has a generally radially outwardly extending tab and said housing includes a groove formed in a side wall of said cavity for receiving said tab, said groove having a first groove portion extending generally parallel to a longitudinal axis of said cavity, an arcuate second groove portion extending in a plane generally perpendicular to said longitudinal axis and a third groove portion extending generally parallel to said longitudinal axis.

18. A device for retaining a visored cap upon a wearer's head, comprising:

a strap member including a pair of strap sections each having a first end and a second end;

a pair of clamp members each having a housing with a cavity and an opening formed therein, a pin member slidable in said cavity and having an opening formed therein and a biasing means in said cavity for biasing said pin member, said pin member opening including a central aperture portion extending generally perpendicular to a longitudinal axis of said pin member and a slotted portion extending radially from said central aperture to a side surface of said pin member, said slotted portion having a first engagement surface, said housing opening having a second engagement surface and said biasing means biasing said first engagement surface toward said second engagement surface whereby when pressure is applied to said pin members against said biasing means to move said first and second engagement surfaces of each said clamp member away from one another and align said pin member opening with said housing opening in each said clamp member, one of said first ends of said strap sections and a portion of a visor of a cap can be inserted into said housing opening and said pin member opening of an associated one of said clamp members, and when said pressure is removed from said pin members, said first ends of said strap sections and the portions of the visor are releasably attached together; and an adjustment member for selectively and adjustably engaging a portion of said strap sections including a housing with a cavity and a central aperture formed therein, a pin member slidable in said adjustment member housing cavity and having a central aperture formed therein, a portion of each of said strap sections extending through said central apertures, and a biasing means in said adjustment member housing cavity for biasing said adjustment member pin member whereby when pressure is applied to said adjustment member pin member against said adjustment member biasing means to align said central apertures, said adjustment member can be moved along said strap sections to selectively vary a distance between said adjustment member and said first ends of said strap sections to accommodate a head of a wearer of the cap, and when said pressure is removed from said adjustment member pin member, walls of said central apertures engage said strap sections to prevent movement of said adjustment member along said strap sections.

* * * * *